(12) United States Patent
Novak et al.

(10) Patent No.: US 10,894,732 B2
(45) Date of Patent: Jan. 19, 2021

(54) SYSTEMS AND METHODS FOR TREATING WASTEWATER

(71) Applicant: REGENTS OF THE UNIVERSITY OF MINNESOTA, Minneapolis, MN (US)

(72) Inventors: Paige Novak, St. Paul, MN (US); Santiago Romero-Vargas Castrillon, Minneapolis, MN (US); Anndee Huff, Minneapolis, MN (US); Marc A. Hillmyer, Minneapolis, MN (US); Michael Tsapatsis, Edina, MN (US)

(73) Assignee: REGENTS OF THE UNIVERSITY OF MINNESOTA, Minneapolis, MN (US)

(*) Notice: Subject to any disclaimer, the term of this patent is extended or adjusted under 35 U.S.C. 154(b) by 0 days.

(21) Appl. No.: 16/433,915

(22) Filed: Jun. 6, 2019

(65) Prior Publication Data
US 2019/0375662 A1 Dec. 12, 2019

Related U.S. Application Data

(60) Provisional application No. 62/681,166, filed on Jun. 6, 2018.

(51) Int. Cl.
| | | |
|---|---|---|
| *C02F 3/30* | (2006.01) | |
| *C02F 1/28* | (2006.01) | |
| *C02F 3/20* | (2006.01) | |
| *C02F 3/10* | (2006.01) | |
| *C02F 101/16* | (2006.01) | |

(52) U.S. Cl.
CPC ............ *C02F 3/307* (2013.01); *C02F 1/281* (2013.01); *C02F 3/102* (2013.01); *C02F 3/208* (2013.01); *C02F 2101/16* (2013.01); *C02F 2203/006* (2013.01)

(58) Field of Classification Search
CPC .......... C02F 3/307; C02F 1/281; C02F 3/208; C02F 3/102; C02F 2101/16; C02F 2203/066; C02F 3/348; C02F 3/02
USPC ........ 210/615, 616, 617, 620, 150, 151, 903
See application file for complete search history.

(56) References Cited

U.S. PATENT DOCUMENTS

| | | | | |
|---|---|---|---|---|
| 6,500,490 | B1* | 12/2002 | Yan ........................ | B01J 29/04 427/343 |
| 2016/0207809 | A9 | 7/2016 | Collison | |
| 2016/0236154 | A1* | 8/2016 | Dubois .................. | B01D 69/10 |
| 2017/0240478 | A1* | 8/2017 | Massai .................... | C05G 5/23 |
| 2018/0327293 | A1* | 11/2018 | Smith ..................... | C02F 3/301 |

OTHER PUBLICATIONS

Côté, et al., "A new membrane-aerated biofilm reactor for low energy wastewater treatment: pilot results", Suez Water Technologies & Solutions—technical paper, Presented at WEFTEC Conference, Oct. 2015.

* cited by examiner

*Primary Examiner* — Fred Prince
(74) *Attorney, Agent, or Firm* — Gregory S. Schwartz; Billion & Armitage

(57) ABSTRACT

The present disclosure relates to wastewater treatment systems for attracting and retaining anaerobic ammonia oxidizing (anammox) bacteria, methods of treating wastewater using such wastewater treatment systems, and the like.

16 Claims, 17 Drawing Sheets

SYSTEMS AND METHODS FOR TREATING WASTEWATER

BACKGROUND

Urine and feces contribute ammonia to wastewater. Most wastewater treatment plants are required to treat ammonia, typically converting it to nitrate, because ammonia causes oxygen depletion and fish toxicity when released to surface water. Unfortunately, the nitrate present in treated wastewater can also cause water quality problems, much like the nitrate in agricultural runoff can. As a result, multiple states (in the United States) and countries are moving towards requiring ammonia and nitrate removal from wastewater.

Bacteria are currently used to remove ammonia and nitrate from wastewater, turning it into harmless nitrogen gas ($N_2$) in a two-step process (ammonia to nitrate with air addition, then nitrate to $N_2$ with "food" (carbon/electron) addition). Though less expensive than chemical treatment technologies, this biological process is expensive, energy intensive, and requires a great deal of space and careful process control.

Approximately 20 years ago a novel type of bacteria was discovered that performed a process called anaerobic ammonia oxidation (or "anammox"). In this process, "anammox" bacteria are able to degrade ammonia directly to $N_2$ with only a small amount of air addition in smaller reactors. This process has the potential to greatly reduce the cost and energy intensity of ammonia removal at wastewater treatment plants while simultaneously improving surface water quality. Despite its significant promise, however, there are several problems with the anammox process: (1) anammox bacteria are notoriously slow growing and a method of retaining them in the treatment reactor is needed; and (2) controlling air addition to optimize the anammox process is difficult. As a result, implementation of the anammox process is limited.

SUMMARY

The present invention relates to wastewater treatment systems that enhance anammox retention and/or partial nitritation/anammox activity, methods of removing nitrogen from wastewater using the wastewater treatment systems, and the like.

In general, the wastewater treatment systems comprise cationic exchange media provided on the surface of a support, such as a membrane or polymer. The cationic exchange media, such as zeolites, can be selected to preferentially sorb ammonium from wastewater. The support can be selected to secure and/or support the cationic exchange media. The support can optionally be adapted to promote biofilm growth and retention of one or more of anammox bacteria, aerobic ammonia-oxidizing bacteria (AOB), and aerobic ammonia-oxidizing archaea (AOA). In addition or in the alternative, the support can optionally be adapted to facilitate partial nitritation by controllably delivering oxygen to bacteria that generate nitrite (e.g., AOB, AOA, etc.), while optionally also suppressing the growth of nitrite oxidizing bacteria (NOB). In this way, the wastewater treatment systems attract and retain anammox bacteria by concentrating, on the surface of the support, ammonium—and optionally, either on the surface of the support or in a mixed-liquid system, nitrite—for use by anammox bacteria in the direct conversion of ammonium to dinitrogen gas in existing wastewater treatment reactors.

In one aspect, the present invention is directed to wastewater treatment systems comprising a plurality of hard polymer pieces capable of being suspended in a mixed-liquid system, and a plurality of zeolite particles provided on the surface of each of the plurality of hard polymer pieces. The plurality of the hard polymer pieces can be adapted to promote biofilm growth and retention of one or more of anammox bacteria, AOB, and AOA. The plurality of zeolite particles can be selected to preferentially adsorb ammonium from wastewater. The system attracts and retains anammox bacteria by concentrating, on the surface of the hard polymer pieces, the ammonium for use by the anammox bacteria. Air can be provided from any source to the mixed-liquid system to generate nitrite.

In another aspect, the present invention is directed to wastewater treatment systems comprising a plurality of zeolite particles provided on the surface of an air-permeable membrane, wherein the air-permeable membrane is adapted to controllably deliver air to bacteria that generate nitrite and the plurality of zeolite particles is selected to preferentially adsorb ammonium from wastewater. The wastewater treatment systems attract and retain anammox bacteria by concentrating, on the surface of the air-permeable membrane, the ammonium and nitrite for use and/or consumption by anammox bacteria.

In a further aspect, the present invention is directed to wastewater treatment systems comprising a plurality of elongated air-permeable hollow fiber membranes spaced-apart and assembled into an array, each having a proximal end mounted to a header and an unmounted distal end freely extending therefrom, and a plurality of zeolite particles provided on the surface of each of the plurality of elongated air-permeable hollow fiber membranes. The plurality of the elongated air-permeable hollow fiber membranes can be adapted to controllably deliver air to bacteria that generate nitrite. The plurality of zeolite particles can be selected to preferentially adsorb ammonium from wastewater. The system attracts and retains anammox bacteria by concentrating, on the surface of the elongated air-permeable hollow fiber membranes, the ammonium and nitrite for use by the anammox bacteria.

In other aspects, the present invention is directed to methods of treating wastewater comprising contacting any of the wastewater treatment systems described herein with an influent wastewater stream and recovering an exit stream with less total nitrogen content than the influent wastewater stream.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

The invention of the present disclosure relates to systems for treating wastewater, methods of treating wastewater, and the like. The treatment systems reduce the cost and energy intensity required for total nitrogen removal from wastewater by utilizing a combined partial nitritation and anaerobic ammonia oxidation ("anammox") system. The anammox bacteria degrade ammonia and nitrite directly to $N_2$ with only a small amount of air addition for partial nitrite production in wastewater reactors. Through careful material selection and engineering design, the treatment systems address two challenges commonly encountered in this biological process. First, notoriously slow growth of the anammox bacteria is solved by modifying the material surfaces such that ammonia is concentrated directly on the surface and selective colonization of the anammox bacteria is stimulated. Also, in some embodiments, a jellyfish or "rack" shape of the material with a bundle of or parallel spaced strings is used to further enhance the growth and retention of anammox bacteria in the reactor. Second, the strings are constructed of hollow tubes with one closed or sealed end to allow air to fill the hollow space and permit controlled air delivery through the walls of the tubes to achieve optimal conditions for partial nitrite production and therefore anammox bacteria growth and total ammonia/nitrate removal.

Figure 1:
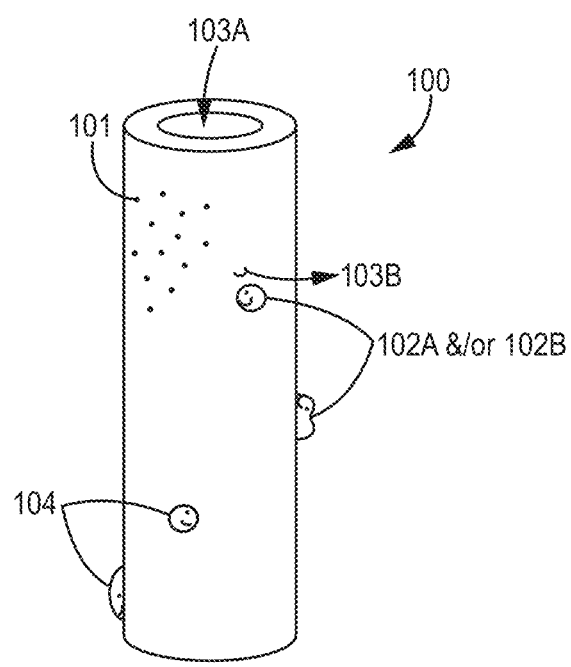
FIG. 1 is a schematic diagram of a hollow-tube for use in a treatment system, according to one or more embodiments of the present disclosure.

FIG. 1 is a schematic diagram of a hollow-tube for use in a treatment system, according to one or more embodiments of the present disclosure. As shown in FIG. 1, the hollow tube 100 may include a plurality of zeolites on a surface of the material. In many embodiments the plurality of zeolites 101 completely cover the material (not shown). The hollow tube 100 may further include AOB 102A and/or AOA 102B colonized on the tube. Air 103A may be provided through the hollow tube and controllably delivered 103B out from the tube. The AOB and/or AOA may consume air 103B to generate nitrite for partial nitritation. In many embodiments, the AOB and/or AOA may be provided as part of one or more of a biofilm and slime layer, wherein the tube may include patches or localized areas of the biofilm/slime layer or the biofilm slime layer may completely cover the tube. The anammox bacteria 104 colonized on the tube may consume the nitrite from the AOB and/or AOA and ammonium sorbed to the zeolite to form $N_2$. The anammox bacteria may similarly be provided as a biofilm layer in patches on the tube or may completely cover the tube.

Figure 2:
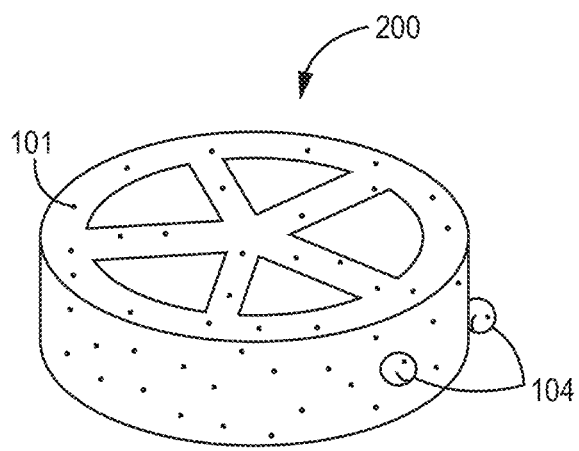
FIG. 2 is a schematic diagram of a treatment system for enhancing anammox retention, among other things, according to one or more embodiments of the present disclosure.

The systems may include a material that preferentially attracts and retains anammox bacteria in a localized area, which might also be combined with other methods of controlling air addition for partial nitritation, providing better, more complete, and faster anammox colonization and retention and therefore a faster and cheaper system for nitrogen removal from wastewater. The material may include a plastic-like material with a plurality of zeolites on a surface of the material designed to create an ideal environment for the proliferation and retention of anammox bacteria. FIG. 2, for example is a schematic diagram of a treatment system 200 for enhancing anammox retention. The plastic material shown in FIG. 2 may be coupled with, for example, solution-phase nitrite generation and used with currently-used or conventional systems to enhance anammox retention. The environment may be created by achieving high concentrations ammonia on a surface of the material to favor selective colonization. In this way, the invention of the present disclosure provides systems and methods to enhance biological oxidation of ammonium in wastewater to harmless and unreactive nitrogen gas via partial nitritation and anammox processes for low-energy wastewater treatment to remove total nitrogen from liquid waste streams.

Definitions

The terms recited below have been defined as described below. All other terms and phrases in this disclosure shall be construed according to their ordinary meaning as understood by one of skill in the art.

As used herein, "anammox bacteria" refers to anaerobic ammonia oxidizing bacteria.

As used herein, the term "ammonia" refers to $NH_3$ and the term "ammonium" refers to $NH_4^+$. As ammonia generally readily dissolves in water and is protonated at pH values less than approximately 9 to form ammonium, ammonia and ammonium may be used interchangeably herein, unless explicitly instructed otherwise.

As used herein, "contacting" refers to the act of touching, making contact, or of bringing to close or immediate proximity, including at the cellular or molecular level, for example, to bring about a physiological reaction, a chemical reaction, or a physical change (e.g., in solution, in a reaction mixture, in vitro, or in vivo). Contacting may refer to bringing two or more components in proximity, such as physically, chemically, electrically, or some combination thereof. Mixing is an example of contacting.

As used herein, "recovering" refers to obtaining any product resulting from a reaction or process. The product may include the product and one or more other chemical species.

As described herein, "wastewater" may include water obtained from any source that requires treatment. For example, the wastewater may be obtained from or include one or more of water from or associated with wastewater treatment processes, fresh water, and aquatic mediums, among other sources.

Wastewater Treatment Systems

In General

Embodiments of the present disclosure describe wastewater treatment systems comprising cationic exchange media provided on the surface of a support, such as a membrane or solid. The cationic exchange media can be selected to preferentially sorb ammonium from wastewater. The support can be selected to support the cationic exchange media and provide durability over extended periods of time (e.g., months or beyond). In some embodiments, the support is adapted to promote biofilm growth and retention of one or more of anammox bacteria, aerobic ammonia-oxidizing bacteria (AOB), and aerobic ammonia-oxidizing archaea (AOA). In some embodiments, the support is adapted to facilitate partial nitritation by controllably delivering oxygen to bacteria that generate nitrite (e.g., AOB, AOA, etc.). In some embodiments, the controlled delivery of air—whether continuous or intermittent—can also suppress the growth of nitrite oxidizing bacteria (NOB). In this way, the systems attract and retain anammox bacteria by concentrating, on the surface of the support, ammonium—and optionally, either on the surface of the support or in a mixed-liquid system, nitrite—for use by anammox bacteria.

The cationic exchange media can include or be selected from any material suitable for sorbing or immobilizing ammonium ions. Examples of suitable cationic exchange media include, but are not limited to, zeolites, clays, activated carbon, derivatives thereof, and the like. In many embodiments, the cationic exchange media includes a material that preferentially exchanges (also referred to throughout as sorbing or adsorbing) ammonium ions. For example, zeolites, whether synthetic or natural, preferentially sorb ammonium ions and thus are an example of an exemplary material. In general, the zeolites may be provided as differently sized zeolite particles or zeolite beads, among other forms. The zeolite may include one or more of a natural zeolite and a synthetic zeolite. For example, the zeolite may include natural zeolites, such as clinoptilolite or faujasite, and/or synthetic zeolites, such as zeolites with a FAU framework or HEU framework. In addition or in the alternative, the zeolite may include cationic surfactant-functionalized zeolites. Other materials can be used herein without departing from the scope of the present invention.

The support can include materials selected from organic materials, inorganic materials, or hybrid organic-inorganic materials. In some embodiments, the support comprises a polymer material. The polymer material can be provided in the form of a hollow fiber membrane, a blended polymer membrane, a polymeric flat sheet, or a three-dimensional hard polymer, among other forms, for operation or use in a plug flow reactor, completely mixed reactor, or fluidized bed, among other reactors. Non-limiting examples of suitable polymer materials include polymers selected from polysulfone, polyethylene, polyvinylidene fluoride, polyacrylonitrile, polyethersulfone, polyvinylalcohol, cellulose acetate, regenerated cellulose, polymethylmethacrylate, and the like. In other embodiments, the support comprises inorganic materials selected from alumina, silica, titania, zirconia, ceramics, metal oxides, and the like. In other embodiments, the support comprises hybrid organic-inorganic materials, which can include, but are not limited to, any combination of the organic and inorganic materials disclosed herein, as well as organometallic complexes, coordination complexes, and the like. In some embodiments, the support includes a membrane (e.g., air-permeable membrane). In some embodiments, the support includes hard polymer pieces.

The support can be adapted to controllably deliver oxygen to bacteria that generate nitrite, or air can be supplied by other means to generate nitrite, which can be employed in instances where solids such as hard polymer pieces are used.

The cationic exchange media is provided on the surface of the support. In some embodiments, the cationic exchange media is tethered (e.g., covalently attached) to the surface of the support. In these embodiments, the wastewater treatment systems can comprise cationic exchange media modified with functional groups, supports modified with functional groups, or both. In one embodiment, the systems comprise zeolite particles modified with functional groups, wherein the modified zeolite particles are tethered to a support comprising a polymer material modified with functional groups. The functional groups are not particularly limited. For example, the functional groups for modifying either the zeolite particles or supports can be selected from amine, epoxy, and carboxyl groups, among others.

In some embodiments, the cationic exchange media is embedded in or on the surface of the support. For example, in one embodiment, the wastewater treatment system comprises a plurality of zeolite particles embedded in or on the surface of the support, wherein the support comprises a polymer material. This can be performed by, for example, adding zeolite particles to a polymer dope solution prior to casting. In some embodiments, the wastewater treatment systems comprise a plasma-etched surface that exposes the embedded cationic exchange media, such as embedded zeolites.

In some embodiments, the cationic exchange media is entrapped on the surface of the support by a polymer layer, such as a polyamide. For example, in one embodiment, the wastewater treatment system comprises a plurality of zeolite particles entrapped by a polyamide layer on the surface of the support. In some embodiments, the polymer layer is a layer that has been treated with a solution, such as aqueous sodium hypochlorite, to expose the entrapped zeolite. In other embodiments, the cationic exchange media (e.g., zeolite) is grown on the surface of the support (e.g., membrane). In other embodiments, one or more of an ultraviolet light treatment and silane treatment may be used to modify one or more of the support (e.g., polymer material) and the cationic exchange media (e.g., zeolite).

Now having described the wastewater treatment systems generally, a discussion of various embodiments of the wastewater treatment systems is provided.

Zeolite-Modified Air-Permeable Membranes

Embodiments of the present disclosure describe wastewater treatment systems comprising a plurality of zeolite particles provided on the surface of an air-permeable membrane, wherein the air-permeable membrane is adapted to controllably deliver air to bacteria that generate nitrite and the plurality of zeolite particles is selected to preferentially adsorb ammonium from wastewater. The wastewater treatment systems attract and retain anammox bacteria by concentrating, on the surface of the air-permeable membrane, the ammonium and nitrite for use and/or consumption by anammox bacteria.

In some embodiments, the wastewater treatment systems comprise a zeolite-functionalized polymer material or inorganic material, which may be provided as a film or membrane, among other forms. In many embodiments, the systems for treating wastewater may comprise a polymer material and a zeolite, wherein the zeolite may adsorb or selectively adsorb ammonium. In other embodiments, the systems for treating wastewater may comprise a polymer material and one or more of a zeolite and a cationic surfactant-functionalized zeolite, wherein the zeolite may adsorb or selectively adsorb ammonium and the cationic surfactant-functionalized zeolite may adsorb or selectively adsorb nitrite. In addition or in the alternative, in some embodiments, the system may include other charged particles and/or chemical groups that function in the same manner, adsorbing/exchanging ammonium and/or nitrite.

The polymer or inorganic material may be provided as a hollow fiber membrane, a blended membrane, a flat sheet, or a three-dimensional hard polymer or inorganic, among other forms, for operation or use in a plug flow reactor, completely mixed reactor, or fluidized bed, among other reactors. The polymer material may include, but is not limited to, one or more of polysulfone, polyethylene, polyvinylidene fluoride, polyacrylonitrile, polyethersulfone, polyvinylalcohol, cellulose acetate, regenerated cellulose, polymethylmethacrylate, and inorganics.

The zeolite may be provided as differently sized zeolite particles or zeolite beads, among other forms. The zeolite may include one or more of a natural zeolite and a synthetic zeolite. For example, the zeolite may include natural zeolites, such as clinoptilolite or faujasite. The zeolite may include synthetic zeolites, such as zeolites with a FAU framework or HEU framework. In addition or in the alternative, the zeolite may include cationic surfactant-functionalized zeolites.

The zeolite may be covalently attached or tethered to or near a surface of the polymer material or inorganic material, or may be embedded or entrapped on or near a surface of the membrane. In some embodiments, the membrane and/or the zeolite may be modified with functional groups sufficient to tether or attach the zeolite to, or embed the zeolite in the membrane or a surface of the membrane. For example, the systems may include a polymer material modified with functional groups, zeolite particles modified with functional groups, or both. The functional groups are not particularly limited. For example, in some embodiments, one or both of the membrane and zeolite particles is modified with functional groups selected from amine, epoxy, and carboxyl groups. In some embodiments, the zeolite is embedded in a surface of the membrane. In these embodiments, the membrane may include a plasma-etched surface that exposes the embedded zeolite. In some embodiments, the zeolite is entrapped on the surface of the membrane by a second polymer, such as a polyamide. In these embodiments, the second polymer may be treated with a solution, such as aqueous sodium hypochlorite, to expose the entrapped zeolite. In some embodiments, the zeolite is grown on the surface of the membrane. In some embodiments, one or more of an ultraviolet light treatment and silane treatment may be used to modify one or more of the polymer material and the zeolite. Polymer materials and zeolites modified in these ways may provide systems with enhanced coverage of zeolites, while retaining and/or securing zeolites to the membrane for a period of time sufficient for treatment of wastewater.

In one embodiment, the wastewater treatment system may comprise a surface-modified polysulfone membrane as a polymer material and faujasite as a zeolite, wherein the faujasite may readily adsorb ammonium ions. A surface of the polysulfone membrane and the zeolite may be treated sufficient for the zeolite to attach to the polysulfone membrane. For example, in an embodiment, each of the surface of the polysulfone membrane and the zeolite may be subjected to ultraviolet light and a silane treatment. The treated zeolite may attach to the treated surface of the polysulfone membrane with good coverage.

The zeolites provided (e.g., attached or embedded) on or near a surface of the polymer material may selectively adsorb one or more of ammonium and nitrite to the exclusion or substantial exclusion of other chemical species. The zeolites' selectivity for ammonium may allow ammonium and/or nitrite to be concentrated on a surface of the polymer material to provide a localized ammonium-rich and/or nitrite-rich environment that is favorable for the attraction, colonization, and retention of the anammox bacteria. For example, the zeolite may preferentially attract and/or retain the anammox bacteria. The anammox bacteria may be selectively retained on or near a surface of the polymer material/zeolite without simultaneously retaining unwanted bacteria, such as nitrite oxidizing bacteria (NOB). For example, the anammox bacteria may be selectively retained on or near a surface of the polymer material to the exclusion or substantial exclusion of other bacteria. In some embodiments, the membrane is adapted to suppress the growth of undesirable bacteria, such as NOB.

Figure 3A:
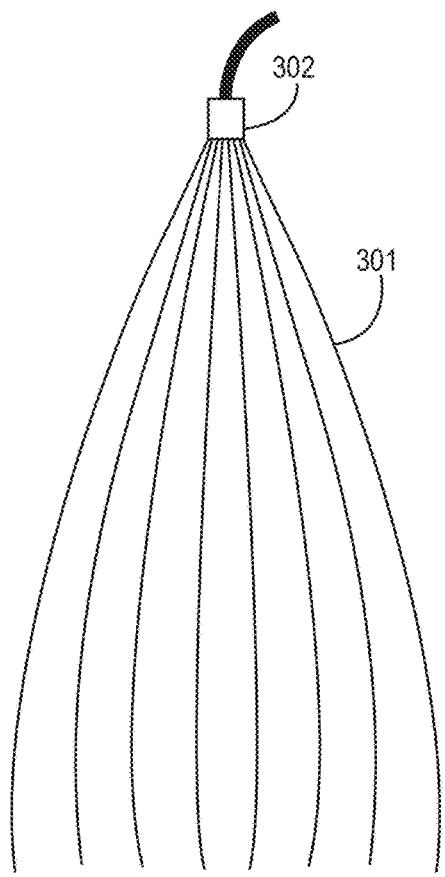
FIG. 3a is a schematic diagram of a treatment system in a jellyfish configuration, according to one or more embodiments of the present disclosure.
Figure 3B:
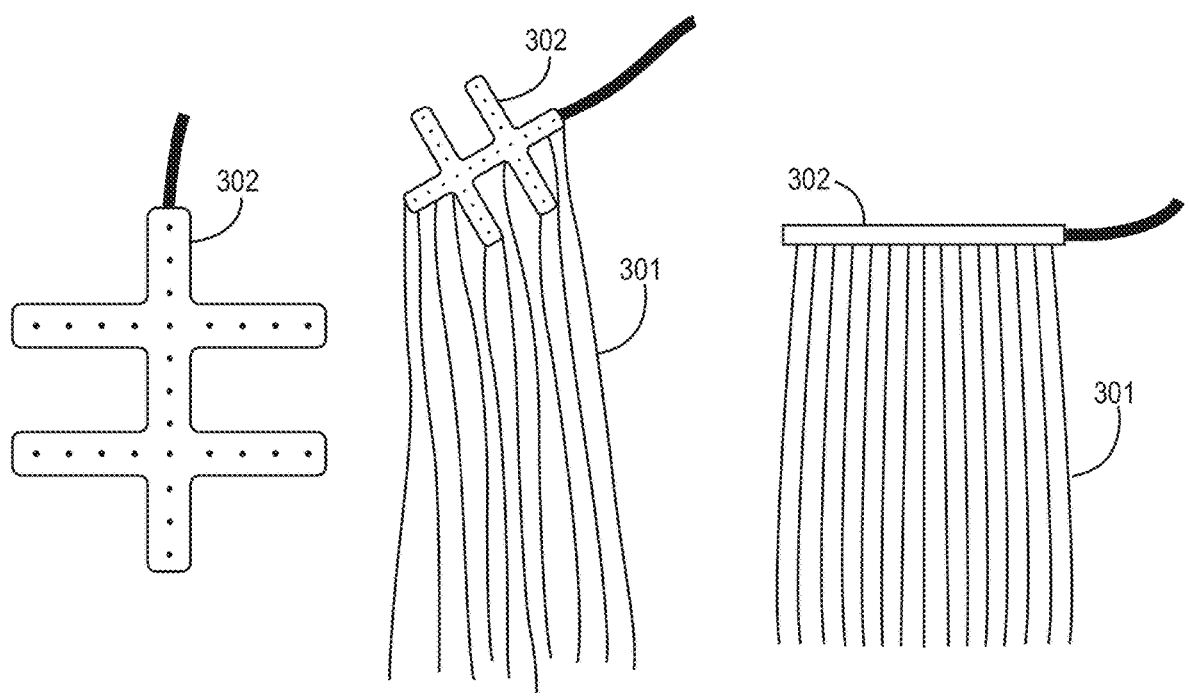
FIG. 3b is a schematic diagram of a treatment system in a rack configuration, showing a top view, perspective view, and side view, according to one or more embodiments of the present disclosure.

The system may be designed to deliver small quantities of air to the anammox bacteria suitable for supporting partial nitritation and thereby, the anaerobic ammonia oxidation process. For example, the configuration and material properties may be designed to controllably deliver air to AOB or AOA. For example, the system may be provided in a variety of configurations, such as a "jellyfish" bundle packing with different spacing and quantities of hollow tubes (FIG. 3a) or a "rack" type packing (FIG. 3b), among others. The system may be designed with various material properties, such as thickness and gas permeability, among others. In an embodiment, the materials may be provided in a jellyfish or rack configuration, wherein strings of the material are provided in a bundle or rack that may be deployed in existing wastewater treatment reactors. The anammox bacteria may grow on these strings and be held in the reactor. In addition, these strings of material may be constructed of hollow tubes with one end sealed or closed (e.g., a "dead end") and space in the hollow tubes may be filled with air. The properties of the material may be engineered to provide a highly controlled rate of air delivery, without requiring an operator to control the air addition externally. For example, in some embodiments, the system maintains about 1% or less dissolved oxygen, optionally without human intervention. In some embodiments, the air may be pulsed through the hollow fibers. In some embodiments, polymer chemistry may be altered and/or modified to control oxygen diffusion through the polymer material (e.g., in a hollow fiber configuration) to facilitate controlled nitrite production via attached AOB or AOA.

Accordingly, embodiments of the present disclosure describe wastewater treatment systems comprising a plurality of elongated air-permeable hollow fiber membranes 301 spaced-apart and assembled into an array, each having a proximal end mounted to a header 302 and an unmounted distal end freely extending therefrom, and a plurality of zeolite particles (not shown) provided on the surface of each of the plurality of elongated air-permeable hollow fiber membranes 301. The plurality of the elongated air-permeable hollow fiber membranes can be adapted to controllably deliver air to bacteria that generate nitrite. The plurality of zeolite particles can be selected to preferentially adsorb ammonium from wastewater. The system attracts and retains anammox bacteria by concentrating, on the surface of the elongated air-permeable hollow fiber membranes, the ammonium and nitrite for use by the anammox bacteria. Any of the embodiments and features described above can be included herein.

In some embodiments, the plurality of elongated air-permeable hollow fiber membranes comprises a polymer selected from polysulfone, polyethylene, polyvinylidene fluoride, polyacrylonitrile, polyethersulfone, polyvinylalcohol, cellulose acetate, regenerated cellulose, polymethylmethacrylate, or a combination thereof. In some embodiments, the plurality of elongated air-permeable hollow fiber membranes comprises an inorganic material selected from alumina, silica, titania, zirconia, ceramics, metal oxides, or a combination thereof.

In some embodiments, the plurality of zeolite particles comprises synthetic or natural zeolites selected from faujasite, clinoptilolite, zeolites with FAU framework, zeolites with HEU framework, cationic surfactant-functionalized zeolites, or a combination thereof.

In some embodiments, the plurality of zeolite particles is tethered to the surface of each of the plurality of elongated air-permeable hollow fiber membranes. In some embodiments, the plurality of zeolite particles includes zeolite particles modified with a functional group selected from amine, epoxy, and carboxyl groups. In some embodiments, the plurality of elongated air-permeable hollow fiber membranes comprises a polymer membrane having a surface modified with a functional group selected from amine, epoxy, and carboxyl groups.

In some embodiments, the plurality of zeolite particles is embedded on the surface of the elongated air-permeable hollow fiber membranes. In some embodiments, the plurality of elongated air-permeable hollow fiber membranes includes a plasma-etched surface that exposes the embedded zeolite particles.

In some embodiments, the plurality of zeolite particles is entrapped on the surface of the elongated air-permeable hollow fiber membranes by a polymer. In some embodiments, the polymer is a polyamide that has been treated with an aqueous sodium hypochlorite solution to expose the entrapped zeolite particles.

In some embodiments, the plurality of zeolite particles are grown on the surface of the elongated air-permeable hollow fiber membranes.

In some embodiments, the plurality of elongated air-permeable hollow fiber membranes has a sealed distal end for storing air. In some embodiments, the system maintains about 1% or less dissolved oxygen, optionally without human intervention. In some embodiments, the plurality of elongated air-permeable hollow fiber membranes is further adapted to suppress the growth of nitrite-oxidizing bacteria.

In some embodiments, the plurality of elongated air-permeable hollow fiber membranes are assembled into a non-circular array. In some embodiments, the plurality of elongated air-permeable hollow fiber membranes are assembled into the array in the absence of any supportive core. In some embodiments, the header is configured to provide a jellyfish configuration. In some embodiments, the header is configured to provide a rack configuration.

Zeolite-Modified Polymer Pieces

Embodiments of the present disclosure describe wastewater treatment systems comprising a plurality of hard polymer pieces capable of being suspended in a mixed-liquid system, and a plurality of zeolite particles provided on the surface of each of the plurality of hard polymer pieces. The hard polymer pieces and zeolite particles can be selected from any of the polymer materials and zeolite particles of the present disclosure. In preferred embodiments, the plurality of hard polymer pieces is adapted to promote biofilm growth and retention of one or more of anammox bacteria, AOB, and AOA; and the plurality of zeolite particles is selected to preferentially adsorb ammonium from wastewater. The system attracts and retains anammox bacteria by concentrating, on the surface of the hard polymer pieces, the ammonium for use by the anammox bacteria. Air can be provided from any source to the mixed-liquid system to generate nitrite.

The systems described herein may be modular and easily scalable. In addition, the systems described herein provide an optimal ecosystem for the anammox bacteria that is easy to maintain and requires minimal operational effort (e.g., by implementing the optimal oxygen flux into the system or timed/controlled pulses of air into the system). Accordingly, the systems described herein enable low-energy, scalable, modular ammonia removal that may be tuned to generate effluent that protects water quality and may be used for other applications such as sustainable irrigation and potable reuse after additional downstream treatment, among other applications.

Methods of Treating Wastewater

Figure 4:
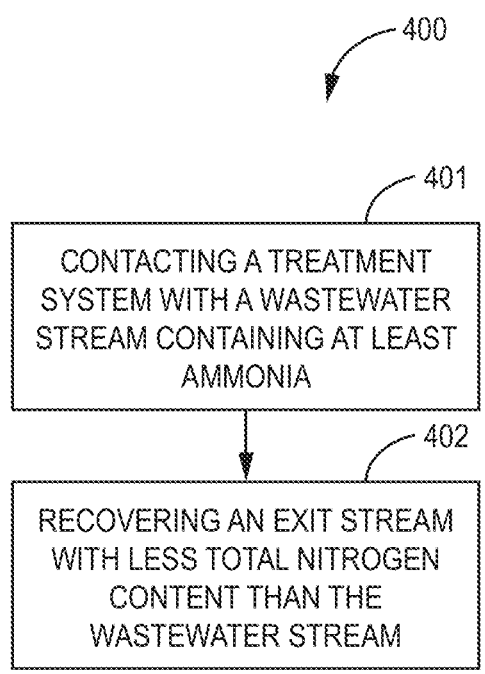
FIG. 4 is a flowchart of a method of removing nitrogen from wastewater, according to one or more embodiments of the present disclosure.

FIG. 4 is a flowchart of a method of treating wastewater, according to one or more embodiments of the present disclosure. As shown in FIG. 4, the method may comprise contacting 401 a treatment system with an influent wastewater stream, wherein the treatment system includes any of the wastewater treatment systems of the present disclosure, and recovering 402 an exit stream with less total nitrogen content than the influent wastewater stream. For example, the wastewater treatment system can include a zeolite attached to and/or embedded in a surface of a polymer material and be configured to attract and retain anammox bacteria for oxidation of ammonium to dinitrogen gas, The method 400 provides a process for treating wastewater using a system that facilitates the colonization and retention of slow-growing anammox bacteria. In particular, the treatment system may attract and sustain anammox bacteria by selectively adsorbing ammonia for ingestion by the anammox bacteria and/or controllably delivering air for controlled nitrite production (partial nitritation) by AOB and/or AOA in support of the anammox process. The method 400 may be used to retain the anammox bacteria in one or more of a side-stream configuration and a mainstream configuration. For example, in some embodiments, the method 400 may be used to treat wastewater containing low concentrations of organic compounds and/or high concentrations of ammonia. In other embodiments, it may be used to attract, retain, and stimulate anammox bacteria in a mainstream wastewater configuration, wherein carbon concentrations may be higher and the ammonia concentration is lower.

The step 401 includes contacting a treatment system with an influent wastewater stream containing at least ammonia. In this step, the wastewater stream is brought into physical contact with, or into immediate or close proximity to, the treatment system, where ammonium and/or ammonia may be degraded to dinitrogen gas and released from the wastewater stream. The wastewater stream may include one or more organic compounds, one or more nitrogen-containing compounds (e.g., nitrate, nitrite, ammonia, ammonium, etc.), and/or any other elements, compounds, and materials typically present in wastewater. The treatment system may include any of the treatment systems of the present disclosure.

During the contacting, the ammonium in the water may selectively adsorb to the treatment system (e.g., onto a surface of the treatment system). The adsorbed ammonium may supply a food source for the anammox bacteria and accordingly may preferentially attract the anammox bacteria to the exclusion or substantial exclusion of other bacteria, etc. The anammox bacteria may degrade the ammonium to dinitrogen gas via the simultaneous utilization of nitrite, reducing a total nitrogen content of the wastewater stream. The ammonium may continue to be adsorbed onto open sites on a surface of the system as the anammox bacteria ingest the adsorbed ammonium. The treatment system may further controllably deliver air for partial nitritation and production of nitrite in support of the anammox process. Controllably delivering air for the anammox process may, either in addition or in the alternative, facilitate or enhance the selectivity of the treatment system for the anammox bacteria. The contacting may proceed without replacement, regeneration, and/or regrowth of the treatment system and/or components thereof.

The step 402 includes recovering an exit stream with less total nitrogen content than the influent wastewater stream. In this step, a treated wastewater stream with less total nitrogen content than the untreated wastewater stream may be recovered as an exit stream. The recovering of the exit stream may include feeding the exit stream to another process or operation, collecting the exit stream, and recycling the exit stream, among other things.

The following Examples are intended to illustrate the above invention and should not be construed as to narrow its scope. One skilled in the art will readily recognize that the Examiners suggest many other ways in which the invention could be practiced. It should be understood that numerous variations and modifications may be made while remaining within the scope of the invention.

Example 1

Zeolites Coating Polymer Membranes Using UV- and Silane-Treatments

Experiments to coat membrane surfaces with zeolite particles were performed. Polysulfone was selected as the membrane material and faujasite was selected as the zeolite. The faujasite-coated polysulfone membrane was then fabricated in the laboratory to carefully control material properties. Zeolite coverage was achieved with ultraviolet treatment of the membrane surfaces combined with silane-treatment of both the membrane and zeolite particles. The zeolite-coated membranes were tested for durability. Sonication of coated membrane samples did not remove the layer of zeolite particles. The durability of the zeolite coating may be further improved with further alteration of material properties and development and/or by imbedding zeolites into the membrane surface.

A bench-scale wastewater reactor was constructed and operated to test the membrane surfaces for preferential growth of anammox bacteria. The reactor was fed synthetic wastewater and was inoculated with a mixed bacteria community from a wastewater treatment plant and anammox-enriched biomass from a full-scale treatment plant. The performance of the reactor, in terms of nitrogen and carbon removal, was monitored and operation was modified to support carbon removal but only limited aerobic ammonia transformation to nitrate and nitrite. This enabled anammox bacteria to thrive and decreased the overall energy used in the reactor for aeration. Racks were constructed and printed on a 3-dimensional printer to facilitate membrane coupon deployment in the reactor. Experiments were also performed with beads of zeolite, glass, or polyethylene for proof of concept testing.

Example 2

Functionalized Zeolites Tethered to Functionalized Polymer Membranes

Figure 5:
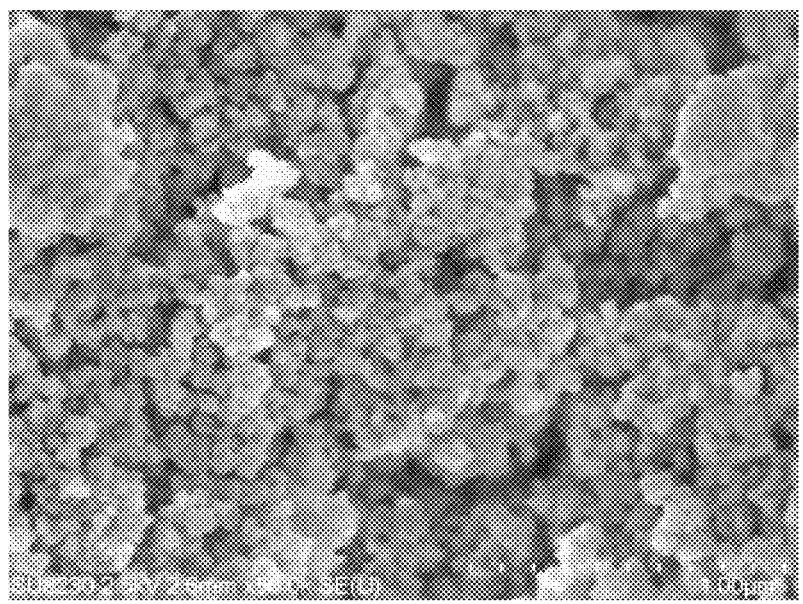
FIG. 5 is a scanning electron microscope (SEM) image of faujasite, according to one or more embodiments of the present disclosure.
Figure 6A:
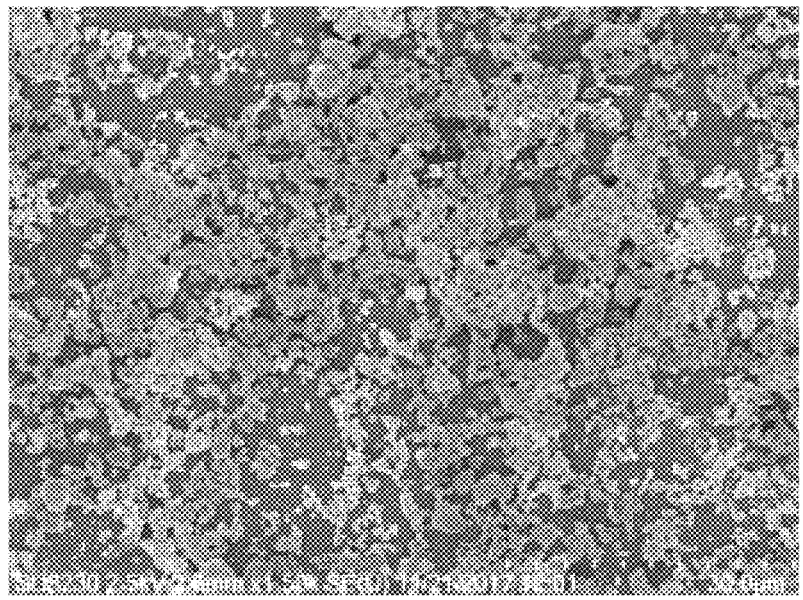
FIGS. 6A-6B show SEM images of zeolite tethered to a flatsheet polysulfone membrane at different magnifications, according to one or more embodiments of the present disclosure.
Figure 6B:
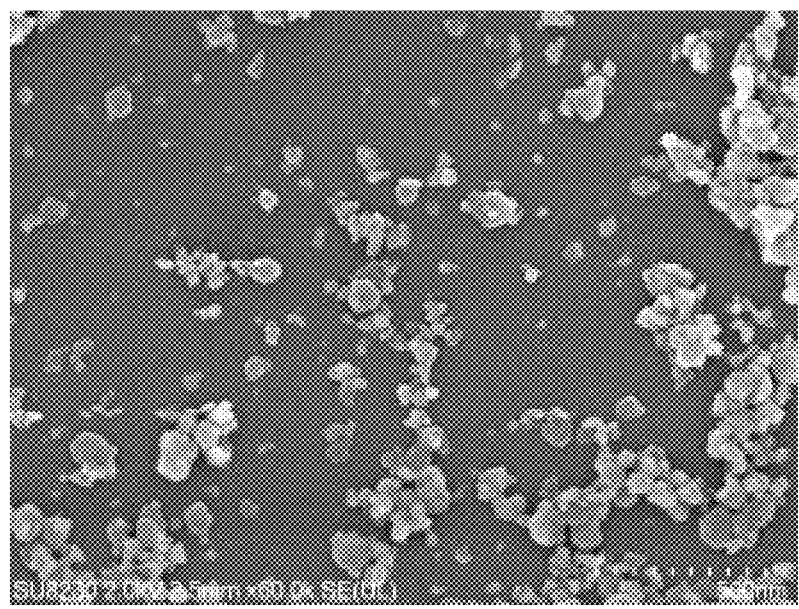
Figure 7:
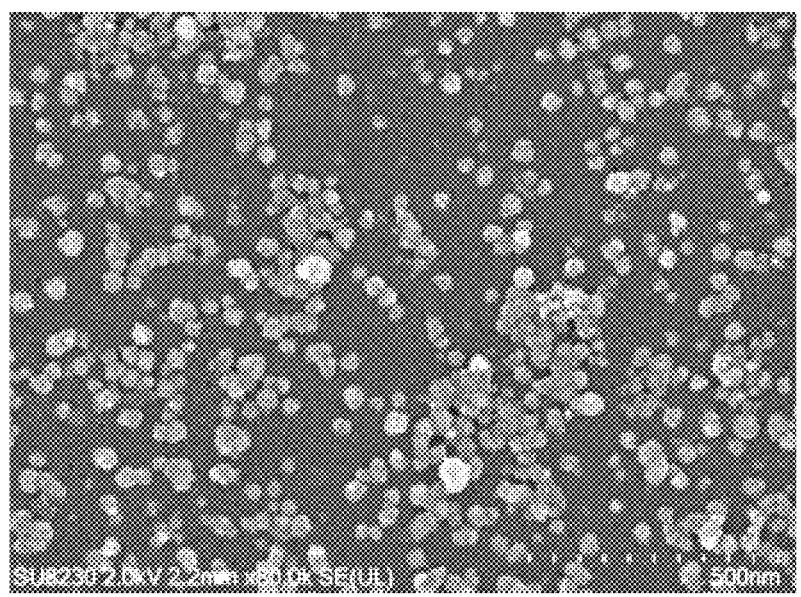
FIG. 7 is SEM image of a membrane to which zeolite was tethered and that was submerged for several months, according to one or more embodiments of the present disclosure.

One method involved modifying the surfaces of zeolite particles and polymer membranes with functional groups followed by tethering the functionalized zeolite particles to the functionalized polymer membrane. Nano-faujasite was selected as the zeolite for its affinity to sorb ammonium. A SEM image of faujasite is provided in FIG. 5. The surface of the nano-faujasite was modified with amine functional groups. A flat sheet polysulfone membrane was selected and its surface was modified with epoxy groups. The functionalized nano-faujasite was then tethered to the flat sheet polysulfone membrane. FIGS. 6A-6B show SEM images of the nano-faujasite zeolite tethered to the flatsheet polysulfone membrane at different magnifications. The durability of the resulting systems was tested by submerging them in a wastewater reactor for durations in the range of several weeks to months. FIG. 7 is a SEM image of a membrane that was submerged for several months. As can be seen, method exhibited high durability and stability as the zeolite remained on the surface after being submerged for several months.

Other methods involve modifying the surface of zeolite particles with amine functional groups and the surface of a polyethersulfone membrane with carboxyl groups followed by tethering the functionalized zeolite to the functionalized polyethersulfone membrane via EDC/NHS (N-ethyl-N'-(3-(dimethylamino)propyl)carbodiimide/N-hydroxysuccinimide) to form an amide bond.

Additional methods involve modifying the surface of zeolite particles with epoxy functional groups and the surface of a crosslinked PVDF membrane with amine groups followed by tethering the functionalized zeolite particles to the crosslinked PVDF membrane.

Example 3

Zeolite Particles Embedded in/on the Surface of Membranes

Figure 8A:
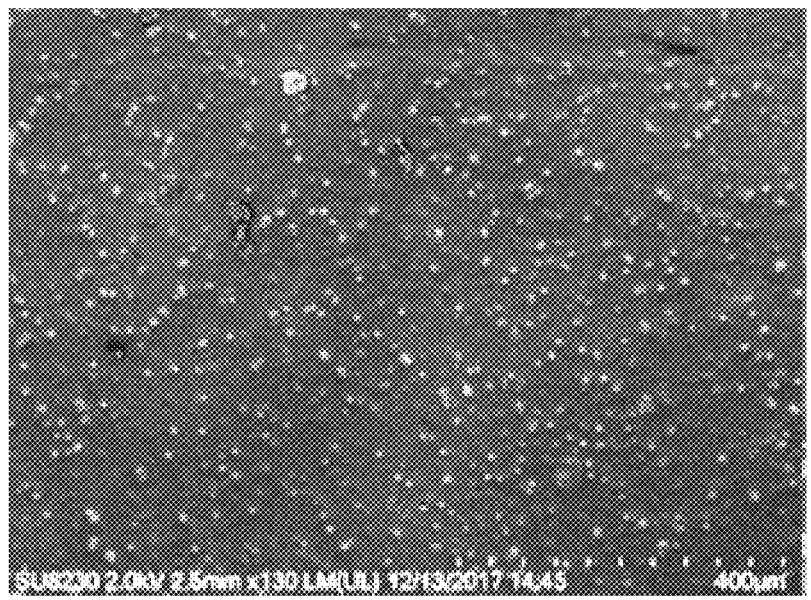
FIGS. 8A-8B show SEM images of zeolites embedded in a polymer membrane at different magnifications, according to one or more embodiments of the present disclosure.
Figure 8B:
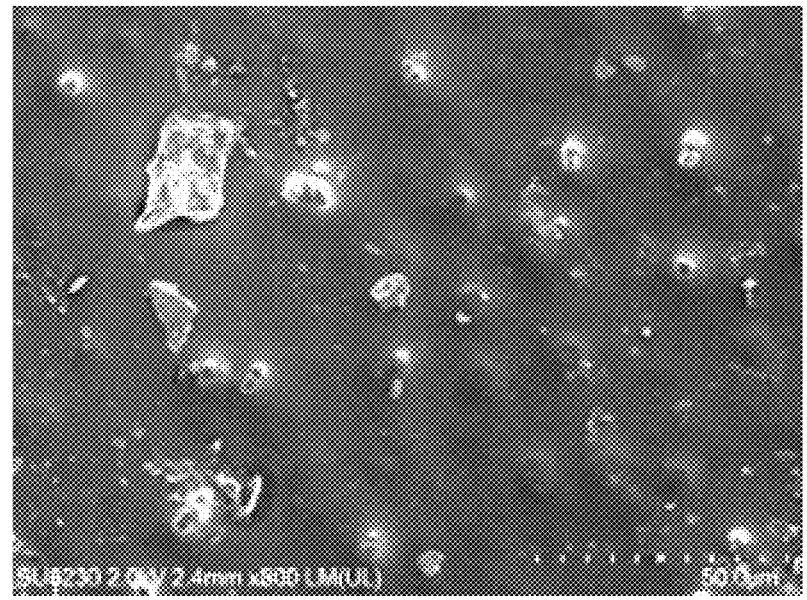

One method involved embedding zeolite particles in/on the surface of polymer membranes by adding zeolite particles to a polymer solution and casting the polymer solution on a polysulfone membrane. FIGS. 8A-8B are SEM images of zeolite embedded in the polymer membrane at different magnifications. Plasma-etching the surface of the polysulfone membrane can be performed to expose the embedded zeolites.

Example 4

Zeolite Particles Entrapped on the Surface of a Polymer Membrane

Figure 9A:
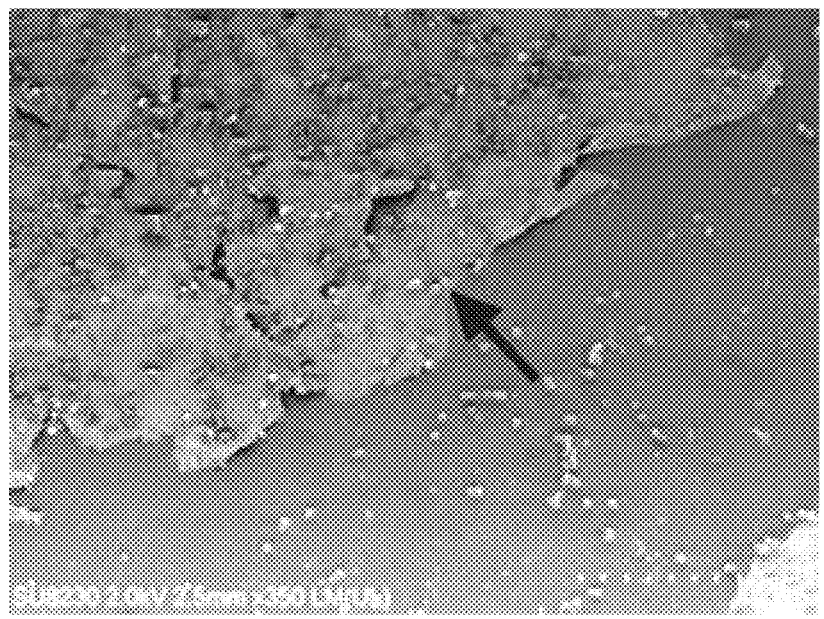
FIGS. 9A-9B show SEM images of a polyamide entrapping zeolite particles on the membrane surface at different magnifications, according to one or more embodiments of the present disclosure.
Figure 9B:
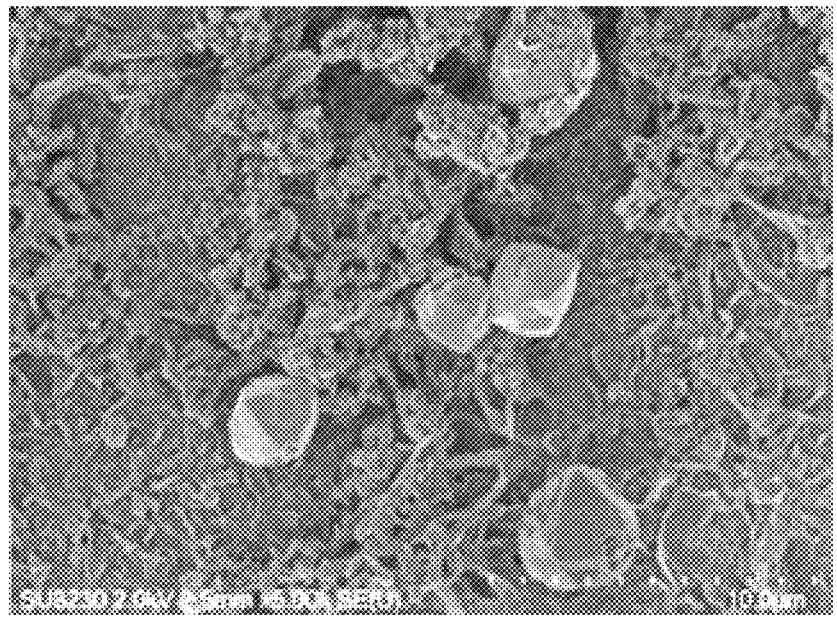

One method involved using a second polymer to entrap zeolite particles on the surface of a polymer membrane. Zeolite particles were deposited on the surface of a polymer membrane and then a polyamide solution was cast on the membrane surface containing the deposited zeolite particles. The casting of the polyamide solution entrapped the zeolite particles on the surface of the polymer membrane. FIGS. 9A-9B are SEM images of zeolite particles entrapped on the membrane surface by polyamide. The polyamide layer can be treated with, for example, an aqueous sodium hypochlorite solution to expose the entrapped zeolites.

Example 5

Zeolite Grown on Inorganic Membrane

Figure 10A:
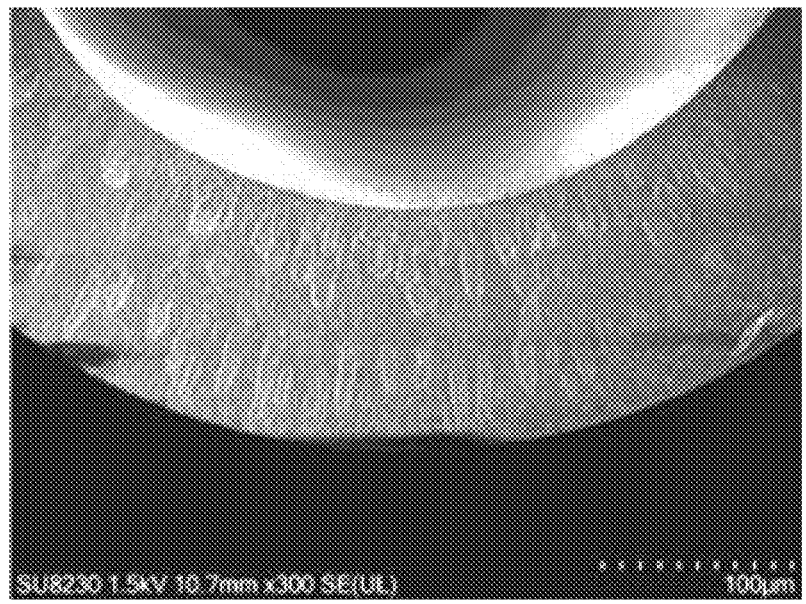
FIGS. 10A-10B show SEM images of a zeolite grown on the outside surface of an alumina hollow fiber membrane at different magnifications, according to one or more embodiments of the present disclosure.
Figure 10B:
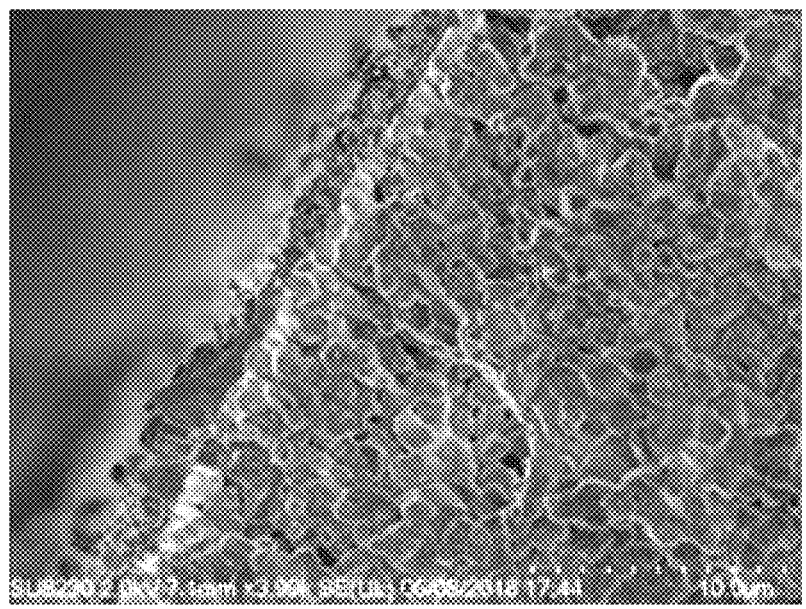

One method involved growing zeolite on inorganic membranes, such as alumina hollow fiber membranes. FIGS. 10A-10B are SEM images of zeolite grown on the outside of alumina hollow fiber.

Example 6

Ammonia Sorption

Figure 11:
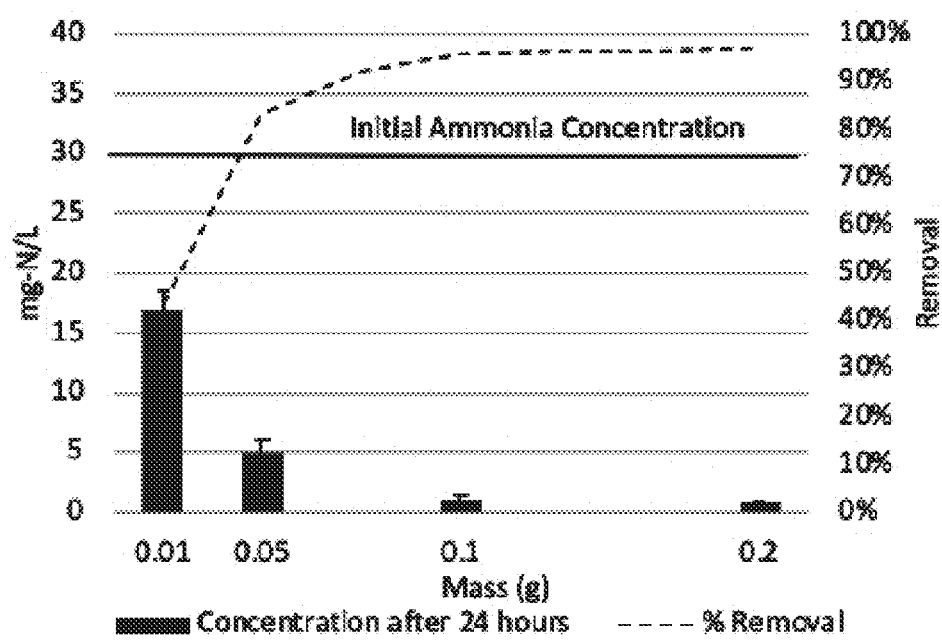
FIG. 11 is a graphical view of faujasite particle ammonia sorption for various masses of faujasite particles, according to one or more embodiments of the present disclosure.
Figure 12:
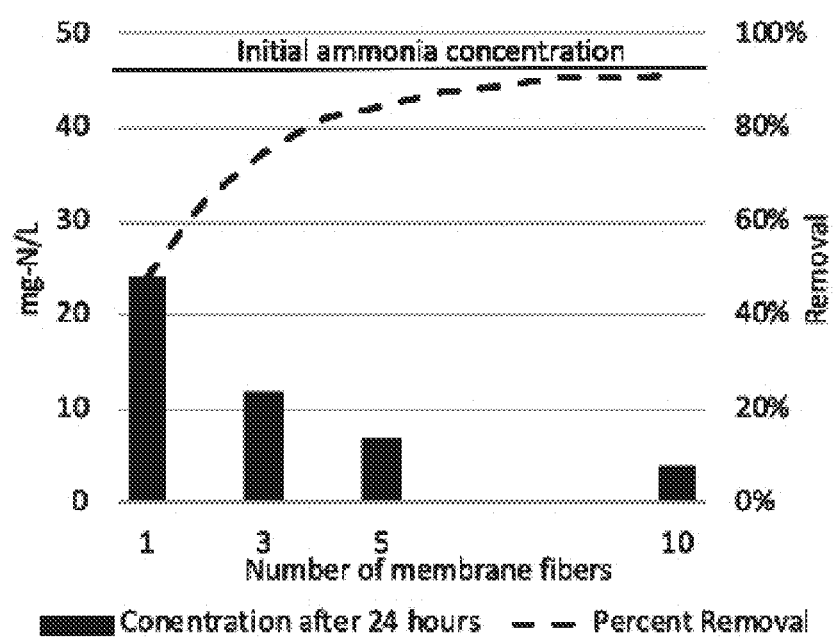
FIG. 12 is a graphical view of membrane ammonia sorption for various numbers of membrane fibers, according to one or more embodiments of the present disclosure.

Two experiments were performed to test the ammonia sorption capacity of zeolite particles and zeolite coated membranes. The first experiment was with an ammonia solution at a concentration similar to typical wastewater (FIGS. 11-12). Both the zeolite particles and the membranes achieved removal over 90% when enough material was tested.

Figure 13:
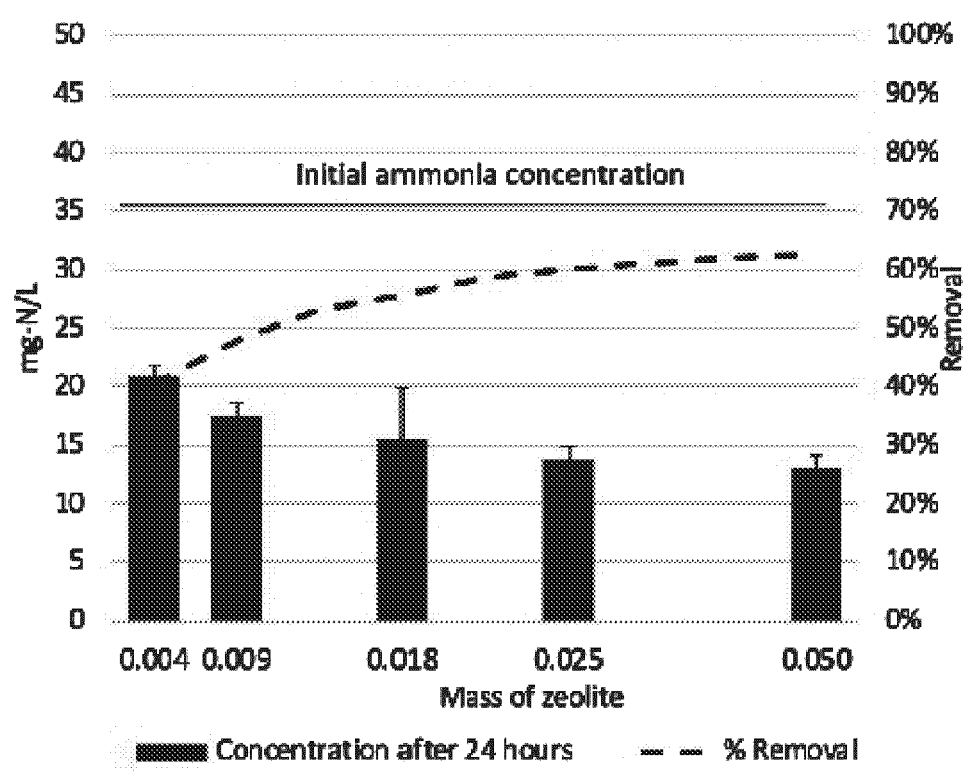
FIG. 13 is a graphical view of faujasite particle ammonia sorption in synthetic wastewater for various masses of faujasite particles, according to one or more embodiments of the present disclosure.
Figure 14:
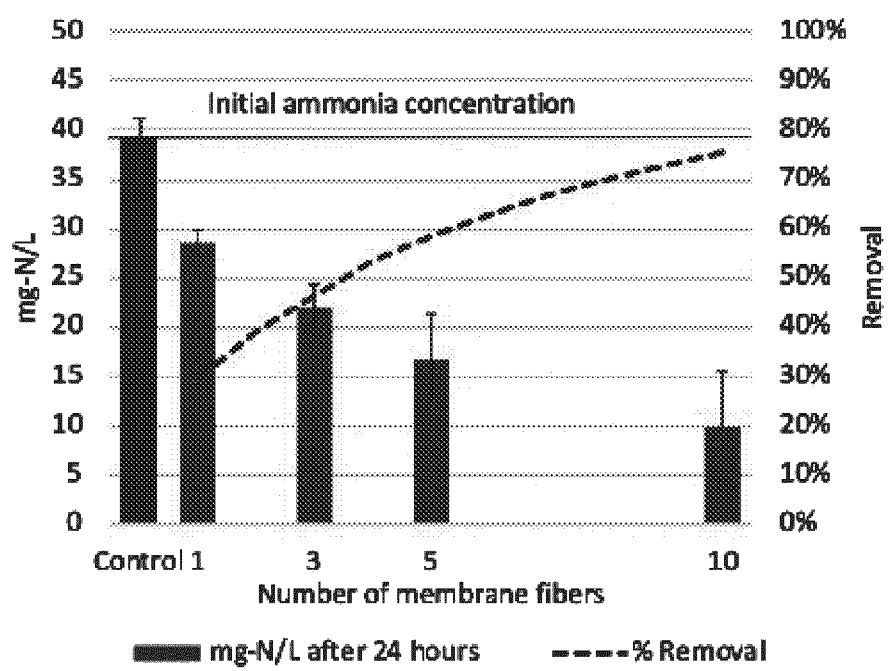
FIG. 14 is a graphical view of membrane ammonia sorption in synthetic wastewater for various numbers of membrane fibers, according to one or more embodiments of the present disclosure.

The second test was performed with ammonia in a synthetic wastewater. There are other cations in wastewater that compete with ammonium ions for sorption sites on the zeolite surface causing the sorption to decrease, but substantial ammonia sorption was still achieved in wastewater conditions (FIGS. 13-14).

Example 7

Ammonia and Total Nitrogen Removal Using Zeolite Particles

Figure 15:
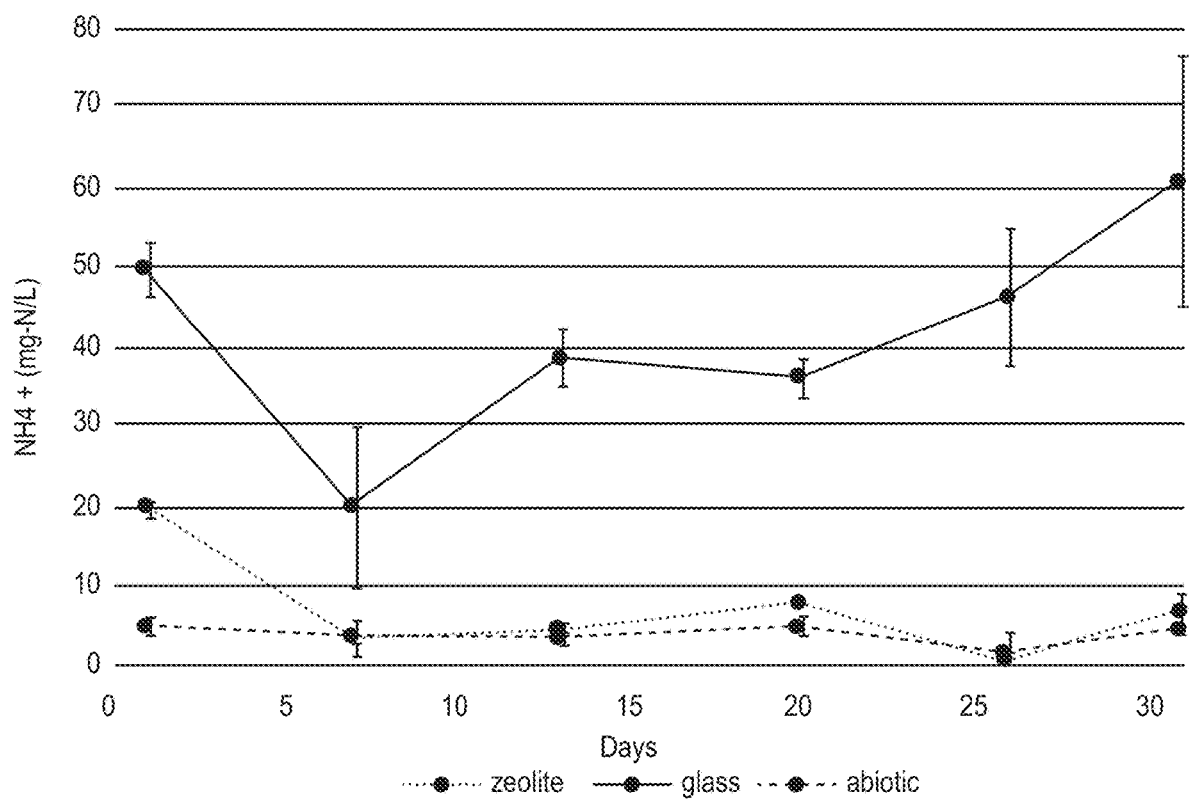
FIG. 15 is a graphical view of effluent ammonia concentration, according to one or more embodiments of the present disclosure.
Figure 16:
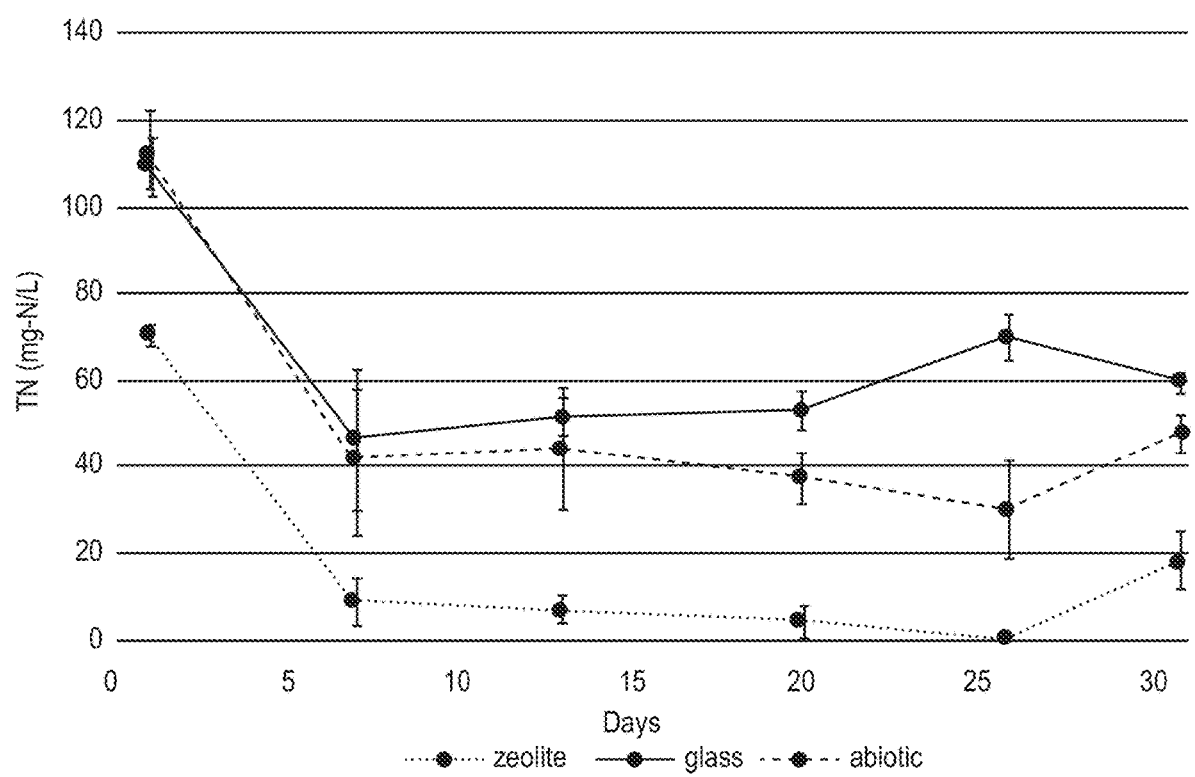
FIG. 16 is a graphical view of effluent total nitrogen concentration, according to one or more embodiments of the present disclosure.
Figure 17:
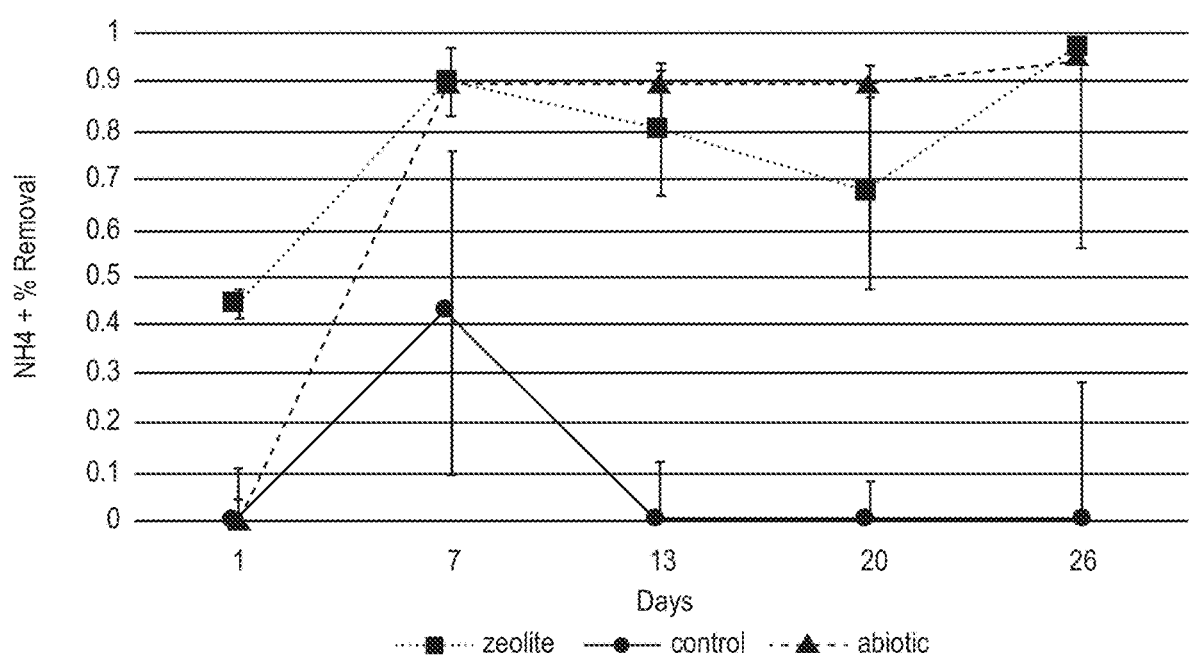
FIG. 17 is a graphical view of the percentage of ammonia removed, according to one or more embodiments of the present disclosure.
Figure 18:
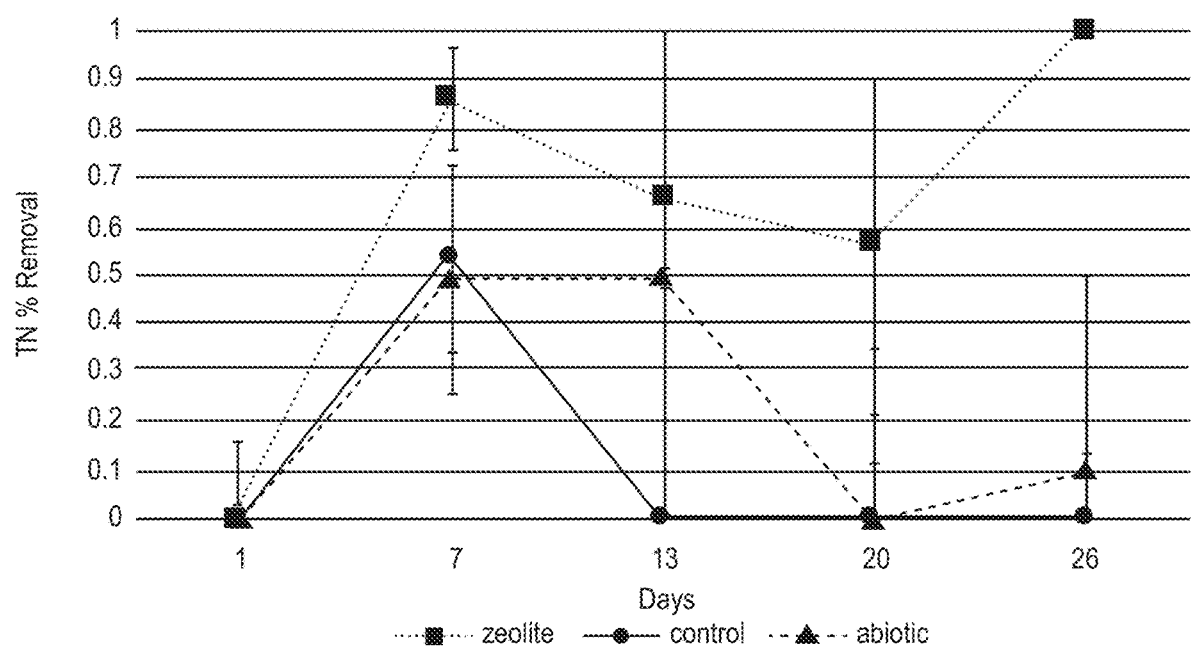
FIG. 18 is a graphical view of the percentage of total nitrogen removed, according to one or more embodiments of the present disclosure.

The zeolite material was tested in a synthetic wastewater batch reactor with biomass (activated sludge from a wastewater treatment plant and anammox enriched sludge from a bench top reactor) to determine ammonia removal and total nitrogen removal rates for the system. FIGS. 15-16 show reactor effluent concentrations of ammonia and total nitrogen for the three reactor configurations tested, which included zeolite particles with biomass, glass particles (an inert surface) with biomass, and zeolite particles with no biomass (abiotic). Each reactor was tested in quadruplicate. The reactor with zeolite and biomass had low effluent ammonia and low effluent total nitrogen. The removal percentage was calculated for these systems (FIGS. 17-18).

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A wastewater treatment system for attracting and retaining anammox bacteria, the system comprising:
 a plurality of elongated air-permeable hollow fiber membranes spaced apart and assembled into an array, each having a proximal end mounted to a header and an unmounted distal end freely extending therefrom, and
 a plurality of zeolite particles tethered to, or embedded, entrapped, or grown on the surface of each of the plurality of elongated air-permeable hollow fiber membranes,
 wherein the plurality of elongated air-permeable hollow fiber membranes is adapted to controllably deliver air to bacteria that generate nitrite and the plurality of zeolite particles is selected to preferentially adsorb ammonium from wastewater, wherein the system attracts and retains anammox bacteria by concentrating, on the surface of the elongated air-permeable hollow fiber membranes, the ammonium and nitrite for use by the anammox bacteria.

2. The system of claim 1, wherein the plurality of elongated air-permeable hollow fiber membranes comprises a polymer selected from polysulfone, polyethylene, polyvinylidene fluoride, polyacrylonitrile, polyethersulfone, polyvinylalcohol, cellulose acetate, regenerated cellulose, polymethylmethacrylate, or a combination thereof.

3. The system of claim 1, wherein the plurality of elongated air-permeable hollow fiber membranes comprises an inorganic material selected from alumina, silica, titania, zirconia, ceramics, metal oxides, or a combination thereof.

4. The system of claim 1, wherein the plurality of zeolite particles comprises synthetic or natural zeolites selected from faujasite, clinoptilolite, zeolites with FAU framework, zeolites with HEU framework, cationic surfactant-functionalized zeolites, or a combination thereof.

5. The system of claim 1, wherein the plurality of zeolite particles is tethered to the surface of each of the plurality of elongated air-permeable hollow fiber membranes and wherein the plurality of zeolite particles includes zeolite particles modified with a functional group selected from amine, epoxy, and carboxyl groups.

6. The system of claim 1, wherein the plurality of zeolite particles is tethered to the surface of each of the plurality of elongated air-permeable hollow fiber membranes and wherein the plurality of elongated air-permeable hollow fiber membranes comprises a polymer membrane having a surface modified with a functional group selected from amine, epoxy, and carboxyl groups.

7. The system of claim 1, wherein the plurality of zeolite particles is embedded on the surface of the elongated air-permeable hollow fiber membranes and wherein the plurality of elongated air-permeable hollow fiber membranes includes a plasma-etched surface that exposes the embedded zeolite particles.

8. The system of claim 1, wherein the plurality of zeolite particles is entrapped on the surface of the elongated air-permeable hollow fiber membranes by a polymer and wherein the polymer is a polyamide that has been treated with an aqueous sodium hypochlorite solution to expose the entrapped zeolite particles.

9. The system of claim 1, wherein the plurality of elongated air-permeable hollow fiber membranes has a sealed distal end for storing air.

10. The system of claim 1, wherein the system maintains about 1% or less dissolved oxygen, optionally without human intervention.

11. The system of claim 1, wherein the plurality of elongated air-permeable hollow fiber membranes is further adapted to suppress the growth of nitrite-oxidizing bacteria.

12. The system of claim 1, wherein the plurality of elongated air-permeable hollow fiber membranes are assembled into a non-circular array.

13. The system of claim 1, wherein the plurality of elongated air-permeable hollow fiber membranes are assembled into the array in the absence of any supportive core.

14. The system of claim 1, wherein the header is configured to provide a jellyfish configuration or a rack configuration.

15. A wastewater treatment system for selectively attracting and retaining anammox bacteria, the system comprising:
 a plurality of hard polymer pieces capable of being suspended in a mixed-liquid system, and
 a plurality of zeolite particles provided on the surface of each of the plurality of hard polymer pieces,
 wherein the plurality of hard polymer pieces is adapted to promote biofilm growth and retention of one or more of anammox bacteria, AOB, and AOA, and the plurality of zeolite particles is selected to preferentially adsorb ammonium from wastewater,
 wherein the system attracts and retains anammox bacteria by concentrating, on the surface of the hard polymer pieces, ammonium for use by the anammox bacteria.

16. A method of treating wastewater, comprising:
 contacting the wastewater treatment system of claim 1 or 15 with an influent wastewater stream containing at least ammonia; and
 recovering an exit stream with less total nitrogen content than the influent wastewater stream.

* * * * *